United States Patent
Lee

(10) Patent No.: US 11,647,393 B2
(45) Date of Patent: May 9, 2023

(54) RADIO RESOURCE SHARING FOR DYNAMIC NETWORK SLICES

(71) Applicant: Verizon Patent and Licensing Inc., Basking Ridge, NJ (US)

(72) Inventor: Jay J. Lee, San Ramon, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 158 days.

(21) Appl. No.: 17/136,167

(22) Filed: Dec. 29, 2020

(65) Prior Publication Data
US 2022/0210658 A1    Jun. 30, 2022

(51) Int. Cl.
| | |
|---|---|
| *H04W 16/10* | (2009.01) |
| *H04W 72/0453* | (2023.01) |
| *H04W 16/14* | (2009.01) |
| *H04W 28/20* | (2009.01) |
| *G06N 20/00* | (2019.01) |

(52) U.S. Cl.
CPC ........... *H04W 16/10* (2013.01); *H04W 16/14* (2013.01); *H04W 28/20* (2013.01); *H04W 72/0453* (2013.01); *G06N 20/00* (2019.01)

(58) Field of Classification Search
CPC ..... H04W 16/10; H04W 16/14; H04W 28/20; H04W 72/0453; G06N 20/00
USPC ........................................................ 370/329
See application file for complete search history.

(56) References Cited

U.S. PATENT DOCUMENTS

| | | | |
|---|---|---|---|
| 11,115,920 B1* | 9/2021 | Seetharaman | H04W 36/14 |
| 2018/0310199 A1* | 10/2018 | Halabian | H04W 28/0252 |
| 2021/0084525 A1* | 3/2021 | Takano | H04W 4/06 |
| 2021/0368514 A1* | 11/2021 | Xing | H04L 41/5019 |
| 2022/0124486 A1* | 4/2022 | Andrews | H04W 12/71 |

* cited by examiner

*Primary Examiner* — Kwang B Yao
*Assistant Examiner* — Syed M Bokhari

(57) ABSTRACT

A device determines a throughput for each network slice of multiple network slices in a mobile network over a number of time windows, and predicts a future throughput for each network slice of the multiple network slices based on the determined throughput. The device determines an available bandwidth of a Radio Access Network (RAN) of the mobile network. The device allocates a respective portion of the available bandwidth of the RAN to each network slice of the multiple network slices based on the predicted future throughput for each network slice.

20 Claims, 11 Drawing Sheets

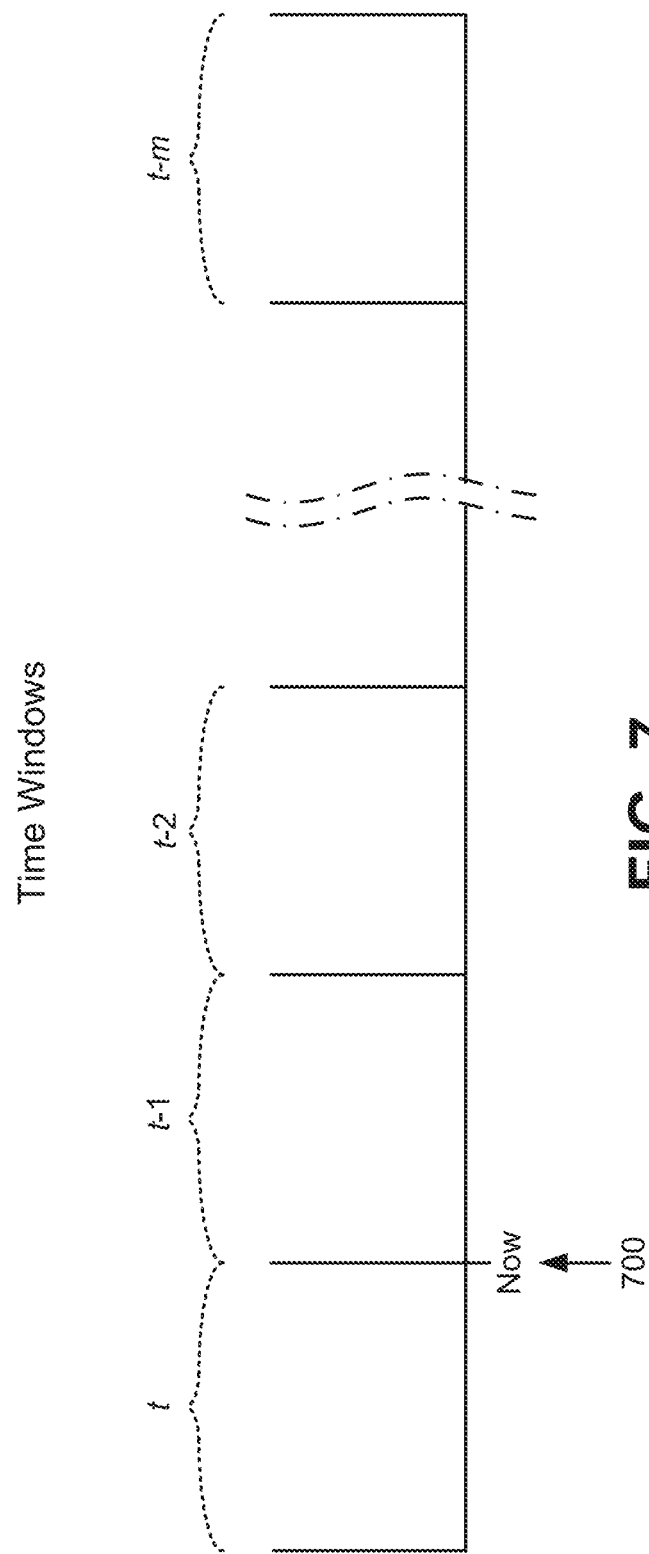

RADIO RESOURCE SHARING FOR DYNAMIC NETWORK SLICES

BACKGROUND

Next Generation mobile networks, such as Fifth Generation New Radio (5G NR) mobile networks, are expected to operate in various frequency ranges, including higher frequency ranges (e.g., in the gigahertz (GHz) frequency band), and to have a broad bandwidth (e.g., near 500-1,000 megahertz (MHz)). The expected bandwidth of Next Generation mobile networks is intended to support higher speed downloads. 5G mobile telecommunications networks may support more reliable, massive machine communications (e.g., machine-to-machine (M2M), Internet of Things (IoT)). Next Generation mobile networks are expected to enable a higher utilization capacity than current wireless networks, permitting a greater density of wireless users. Next Generation mobile networks are designed to increase data transfer rates, increase spectral efficiency, improve coverage, improve capacity, and reduce latency.

BRIEF DESCRIPTION OF THE DRAWINGS

FIG. 7 illustrates an example of a sequence of time windows over which network slice throughput is measured in each time window;

DETAILED DESCRIPTION OF THE PREFERRED EMBODIMENTS

Figure 1:
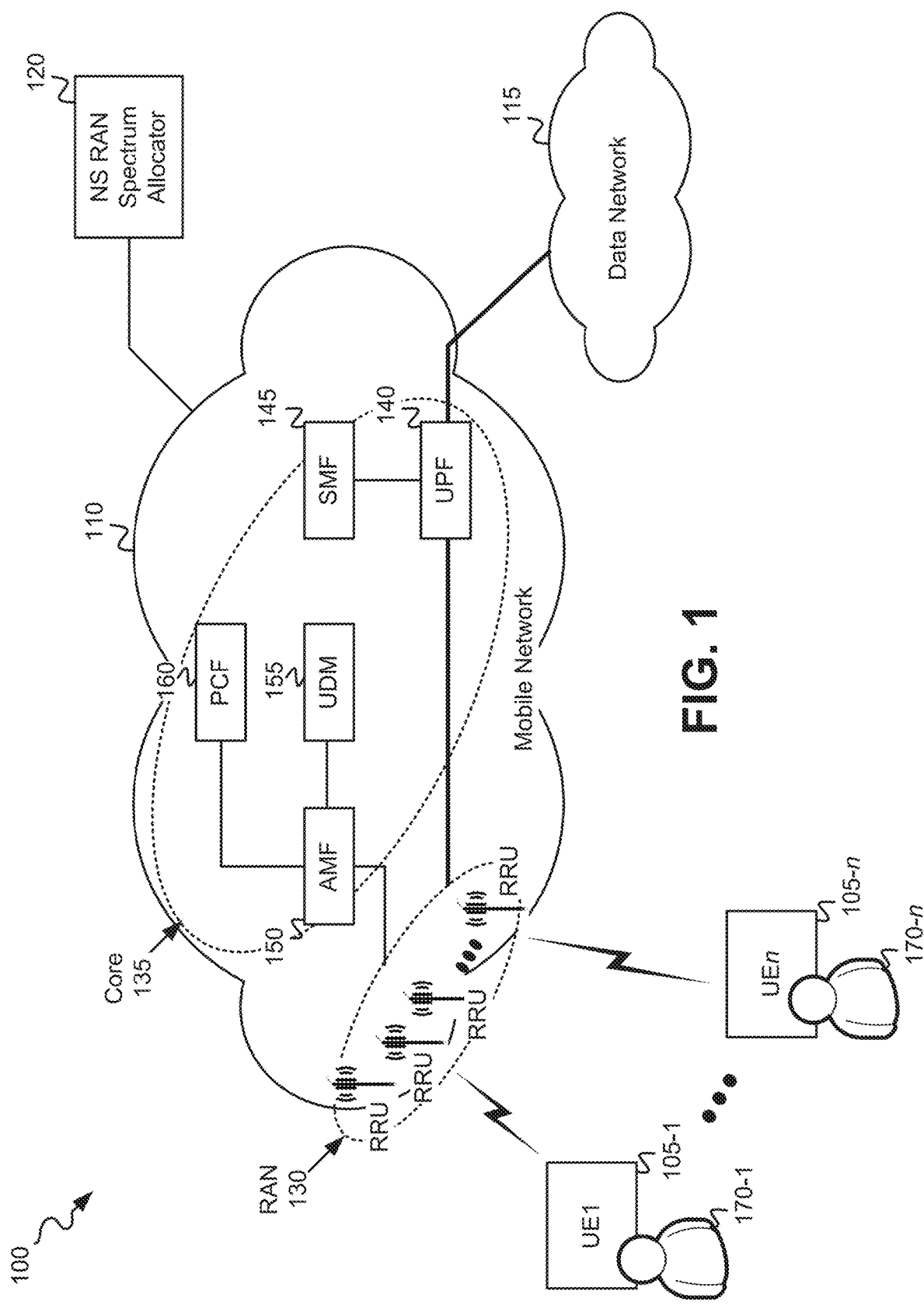
FIG. 1 depicts an exemplary network environment in which mobile network radio resources may be shared among multiple, dynamic network slices within the mobile network.

The following detailed description refers to the accompanying drawings. The same reference numbers in different drawings may identify the same or similar elements. The following detailed description does not limit the invention, which is defined by the claims.

"Network Slicing" is an innovation being implemented in Next Generation Mobile Networks (e.g., 5G NR networks). Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Bandwidth, capacity, and connectivity functions are allocated within each network slice to meet the requirements of the objective of the particular network slice. Network slicing may be implemented in a dynamic fashion, such that the slices of the virtualized network may change over time and may be re-customized to meet new or changing needs of applications, services, devices, customers, or operators.

With Next Generation mobile networks, such as 5G NR networks, being designed to deliver multi-Gbps peak data rates, ultra-low latency, massive network capacity, high reliability, and high availability mobile service, many new applications are likely to emerge to take advantage of the capabilities of these networks. Applications, such as factory automation, industrial Internet of Things (IoTs), Vehicle-to-Everything (V2X), virtual/augmented reality (VR/AR), and advanced telemedicine, may leverage the expanded capabilities of Next Generation mobile networks. Each different type of new application has its own network needs and requirements, thus, presenting a diverse range of requirements that may necessitate a wide variety of heterogenous services to be offered by the Next Generation mobile network. This heterogeneity of network services in Next Generation mobile networks requires a flexible Radio Access Network (RAN) that has versatility and an ability to adapt to the different types of offered network services. In order to meet this heterogeneity of network services, network slicing has been adopted in Next Generation networks. By slicing a mobile network into multiple logical networks, network slicing can support on-demand tailored services for distinct application scenarios on a common physical mobile network. Network slicing, therefore, enables the sharing of one common physical network infrastructure with multiple independent virtual networks such that the each of the multiple virtual networks act as end-to-end networks that may be dedicated to individual network services. Each virtual network of the network slicing is bound by its own Service Level Agreements (SLAs), Quality of Services (QoSs), and a desired set of performance requirements (e.g., data rates, latency, capacity, reliability).

Since network slicing allows multiple virtual networks to be created on top of a common shared physical network infrastructure, and the virtual networks are customized to meet the specific needs of particular applications, services, and/or customers, a key question is how to allocate or share limited network resources among multiple network slices to meet the requirements of each network slice. In certain Next Generation networks, the resource allocation can be a significant issue in the RANs because of the limited radio spectrum that represents a finite resource to be shared among numerous existing and emerging services and applications. There is, therefore, a need for an efficient and dynamic method for allocating the finite RAN radio resource into multiple network slices. The allocation method may determine available resources over time, due to network slices being inherently time varying in nature, such as due to the following: 1) fluctuations of data traffic because of unpredictable mobile user activities; 2) cultural and/or sport events, conventions, etc.; 3) variabilities in time and location; 4) service attacks and server downtime; 5) variability of radio channel quality; and/or 6) link and node failure in the network. The radio resource allocation technique described herein dynamically assigns the finite radio resources of the RAN to the network slices in order to satisfy this network variability.

Network slices can potentially be customized for individual services on a one-to-one basis. However, this may result in too many network slices in the network, causing significant network overhead. In practice, many types of services have similar network performance requirements. For example, many IoT-related services (e.g., industrial IoT, massive IoT (mIoT)) may require a similar network behavior and, therefore, may be grouped into a single network slice. Applications, such as V2X, gaming, and VR/AR, require very low latency, while high definition (HD) video streaming services require high data rate services.

The radio resource allocation technique described herein defines each network slice as a set of individual services or applications that require a similar network behavior and/or performance. Therefore, each set of individual services/applications, requiring a similar network behavior and/or performance, is assigned to a same network slice among multiple network slices. After assignment of groups of individual services/applications to network slices, the RF spectrum of the RAN may then be allocated among the multiple network slices. Two different RAN RF spectrum allocation techniques are described herein: 1) a fixed sub-band allocation technique in which each network slice is allocated its own fixed, predefined contiguous sub-band of RF spectrum in the RAN; and 2) a variable sub-band allocation technique in which each network slice is allocated its own fixed sub-band and is also allocated a variable sub-band. The fixed sub-band includes bandwidth that is dedicated for use by the network slice to which it is allocated. The variable sub-band includes bandwidth that may be shared among the multiple network slices based on traffic demand within the multiple network slices. Therefore, a variable sub-band allocated to a particular network slice may be used by that network slice or may be shared with one or more other network slices based on a current traffic demand within each of the multiple network slices.

FIG. 1 depicts an exemplary network environment 100 in which mobile network radio resources may be shared among multiple, dynamic network slices within the mobile network. As shown, network environment 100 includes user equipment devices (UEs) 105-1 through 105-n, a mobile network 110, a data network 115, and a Network Slice (NS) spectrum allocator 120.

UEs 105-1 through 105-n (referred to herein as a "UE 105" or "UEs 105") may each include any type of mobile electronic device having a wireless communication capability. UE 105 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user/subscriber may carry, use, administer, and/or operate each UE 105. A user 170-1 is shown in association with UE 105-1 and a user 170-n is shown in association with UE 105-n.

Mobile network 110 may include any type of Public Land Mobile Network (PLMN) that supports network slicing. Mobile network 110 may include a RAN 130 and a core network 135. RAN 130 may include various types of radio access equipment that implement radio access communication with UEs 105. The radio access equipment of RAN 130 may include, for example, base band units (not shown) and multiple remote radio units (RRUs). In some implementations, the RRUs may each include a Central Unit (CU) and one or more Distributed Units (DUs) (not shown). Each of the RRUs includes a device(s) that operates as a radio function unit which transmits and receives radio frequency (RF) signals to/from UEs 105. RAN 130 may additionally include other nodes, functions, and/or components not shown in FIG. 1.

Core network 135 includes functions, devices, or nodes that perform necessary functions for operating the mobile network 110 including, among other functions, mobile network access management, session management, and policy control. In the exemplary implementation of FIG. 1, core network 135 is shown as including a 5G mobile network that further includes 5G network components, such as a User Plane Function (UPF) 140, a Session Management Function (SMF) 145, an Access and Mobility Management Function (AMF) 150, a Unified Data Management (UDM) function 155, and a Policy Control Function (PCF) 160.

UPF 140 includes, or is executed by, a network device that acts as a router and a gateway between mobile network 110 and data network 115, and forwards session data between data network 115 and RAN 130. Though only a single UPF 140 is shown in FIG. 1, mobile network 110 may include multiple UPFs 140 disposed at various geographic locations in network 110. SMF 145 includes, or is executed by, a network device that performs session management, allocates network addresses to UEs 105, and selects and controls UPFs 140 for data transfer. AMF 150 includes, or is executed by, a network device that performs authentication, authorization, and mobility management for UEs 105. UDM 155 includes, or is executed by, a network device that manages data for user access authorization, user registration, and data network profiles. UDM 155 may include, or operate in conjunction with, a User Data Repository (UDR) (not shown) which stores user data, such as customer profile information, customer authentication information, and encryption keys for the information. PCF 160 includes, or is executed by, a network device that implements policy and charging control for service data flows and Protocol Data Unit (PDU) session related policy control.

Data network 115 may include one or more interconnected networks, such as local area networks (LANs), wide area networks (WANs), metropolitan area networks (MANs), and/or the Internet.

NS RAN spectrum allocator 120 (referred to herein as "spectrum allocator 120") includes one or more network devices that connect to mobile network 110 and which obtain and store throughput and bandwidth data for each network slice within mobile network 110 over x previous time windows relative to a current time window t (e.g., time windows t−1, t−2, t−3, . . . , t−x). Spectrum allocator 120 further predicts throughput for each network slice of multiple network slices for the current time window t and allocates and assigns radio resources of RAN 130 to the multiple network slices for the current time window t based on the predicted throughput. In some implementations, spectrum allocator 120 may include a virtual entity implemented by one or more devices within mobile network 110, such as an RRU(s) of RAN 130, a device(s) implementing AMF 150, a device(s) implementing SMF 145, and/or a device(s) implementing PCF 160.

The configuration of network components of network environment 100 is shown in FIG. 1 is for illustrative purposes. Other configurations may be implemented. Therefore, network environment 100 may include additional, fewer, and/or different components that may be configured in a different arrangement than that depicted in FIG. 1. For example, though mobile network 110 is depicted in FIG. 1 as a 5G network with 5G network components/functions, mobile network 110 may alternatively include a 4G or 4.5G network with corresponding network components/functions, or a hybrid Next Generation/4G network that includes certain components of both a Next Generation network and a 4G network. As another example, though spectrum allocator 120 is shown in FIG. 1 as being connected to mobile network 110, in alternative implementations spectrum allocator 120 may instead connect to data network 115.

Figure 2:
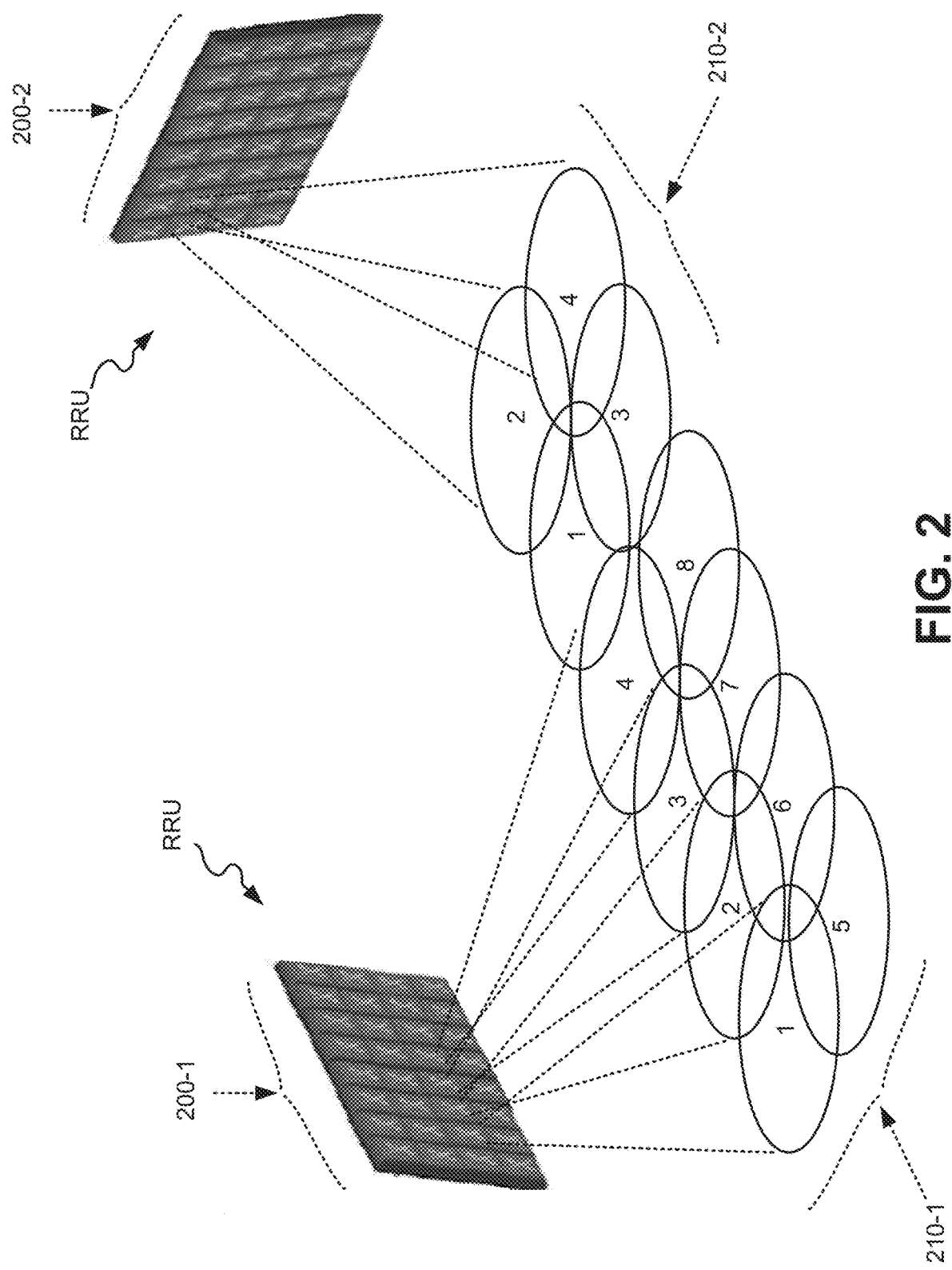
FIG. 2 illustrates an example of a wireless network coverage area produced by Remote Radio Units of the Radio Access Network of FIG. 1.

FIG. 2 illustrates an example of a wireless network coverage area produced by RRUs of RAN 130 in which the RF spectrum available to the RAN 130 is used among the cells of the coverage area. Each RRU may include one or more antenna arrays, such as a first antenna array 200-1 shown for a first RRU and a second antenna array 200-2 shown for a second RRU in FIG. 2. Each antenna array 200, via respective antenna beams of the antennas of the array, generates respective wireless network coverage areas 210. The wireless network coverage areas 210 may be composed of multiple cells that are formed by respective antenna beam patterns associated with each of the antennas of the antenna arrays 200. Each of the antenna arrays 200 shown in FIG. 2 may produce a wireless network coverage area 210 within which UEs 155 may transmit to, and receive from, antenna arrays 200 via wireless RF transmissions. The wireless network coverage areas 210 may provide wireless connections for UEs 105 over particular geographic areas. Each of the antenna arrays 200 may transmit and/or receive data traffic to/from UEs 105 (not shown) using frequencies within the radio frequency (RF) spectrum available to the RAN 130, such as frequencies within the fixed and/or variable sub-bands described below with respect to FIGS. 4 and 5.

FIG. 2 depicts a simplified example in which eight antenna beams of antenna array 200-1 generate respective overlapping cells (numbered 1 through 8) that produce the wireless network coverage area 210-1 and four antenna beams of antenna array 200-2 generate respective overlapping cells (numbered 1 through 4) that produce the wireless network coverage area 210-2. For simplicity, the wireless network coverage areas 210-1 and 210-2 in FIG. 2 show only a portion of the cells associated with respective antenna arrays 200-1 and 200-2. A UE 105 (not shown) may transit between cells (e.g., between cell 1 and cell 6 of coverage area 210-1, or between cell 1 and cell 5 of coverage area 210-1), and the wireless network enables wireless network service to continue by "handing off" the UE 105 from one cell to the next.

Antenna arrays 200-1 and 200-2 (referred to herein as "antenna array 200" or "antenna arrays 200") may each include an array of antennas, such as, for example, a Full Dimension Multiple Input Multiple Output (FD-MIMO) or massive MIMO antenna array, that may form antenna beams in horizontal and/or vertical directions to enable each array of antennas to cover a three-dimensional space in the vicinity of each array 200. For example, each antenna array 200 may include a number of horizontal antennas and a number of vertical antennas arranged in a row(s) and column(s) configuration. As an example, an antenna array 200 may include a 2×4 array with the number of vertical antennas equaling the number of rows (e.g., 2) and the number of horizontal antennas equaling the number of columns (e.g., 4). Alternatively, each antenna array 200 may include an m×n (m rows by n columns), where m is a number of vertical antennas in the array 200 and n is a number of horizontal antennas in the array 200, m and n may be any positive integer greater than or equal to one, and m and n may or may not equal one another.

Figure 3:
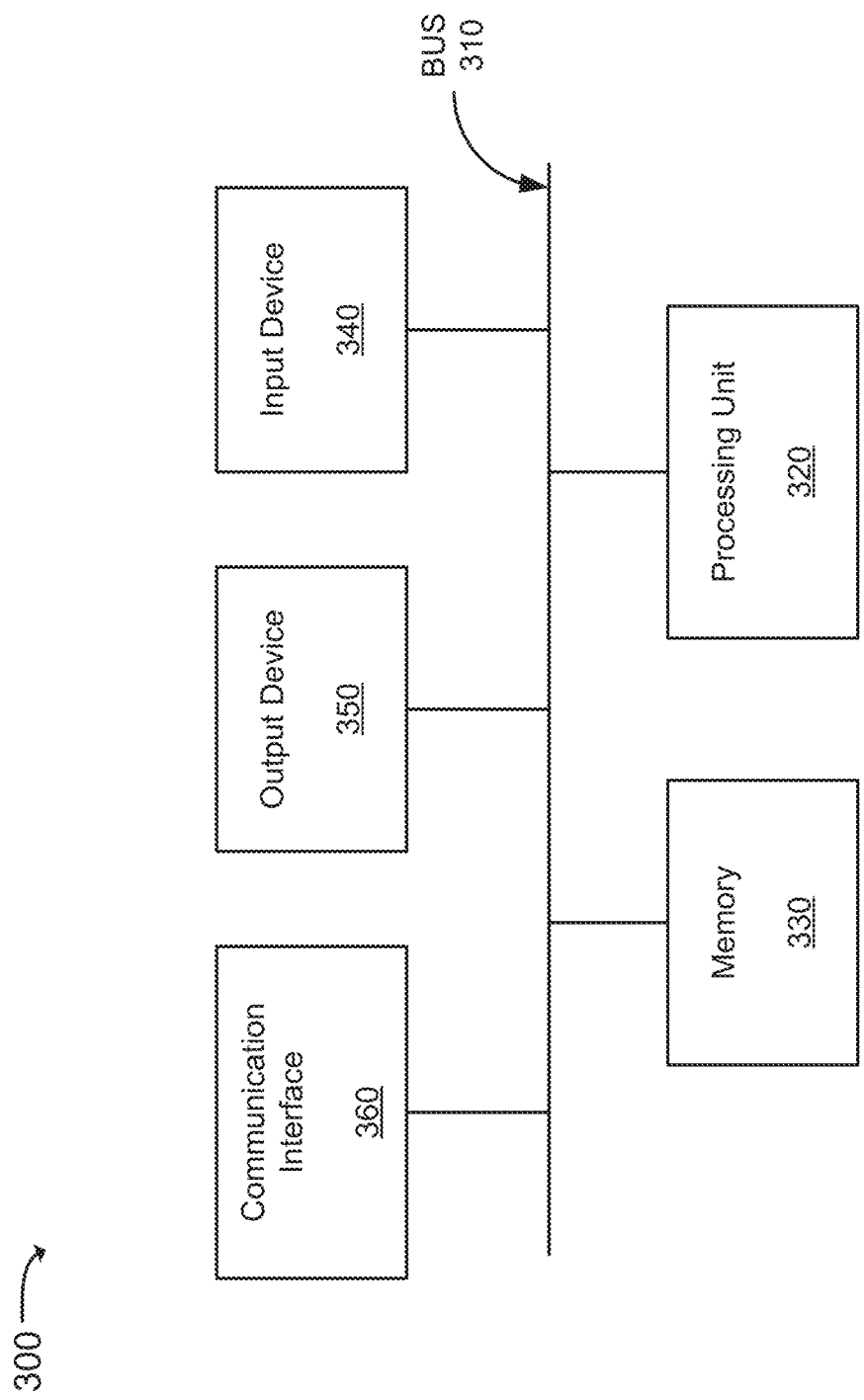
FIG. 3 is a diagram that depicts exemplary components of a device that may correspond to the User Equipment devices (UEs), Remote Radio Units (RRUs), and the spectrum allocator of FIG. 1.

FIG. 3 is a diagram that depicts exemplary components of a device 200. UEs 105, the RRUs of RAN 130, and spectrum allocator 120 may include the same, or similar, components to those of device 300 shown in FIG. 3. Further, each of the functions UPF 140, SMF 145, AMF 150, UDM 155 and PCF 170 of core network 135 may be implemented by a network device that is the same, or similar to, device 300. Some of functions UPF 140, SMF 145, AMF 150, UDM 155 and PCF 160 may be implemented by a same device 300 within network 110, while others of the functions may be implemented by one or more separate devices 300 within network 110.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors, or processing logic, which may interpret and execute instructions. Memory 330 may include one or more memory devices for storing data and instructions. Memory 330 may include a random access memory (RAM) or another type of dynamic storage device that may store information and instructions for execution by processing unit 520, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via network 110 and/or data network 115. In the case of RRUs, communication interface 360 may further include antenna arrays, such as the antenna arrays 200 described with respect to FIG. 2.

The configuration of components of device 300 illustrated in FIG. 3 is for illustrative purposes. Other configurations may be implemented. Therefore, device 300 may include additional, fewer and/or different components than those depicted in FIG. 3.

Figure 4:
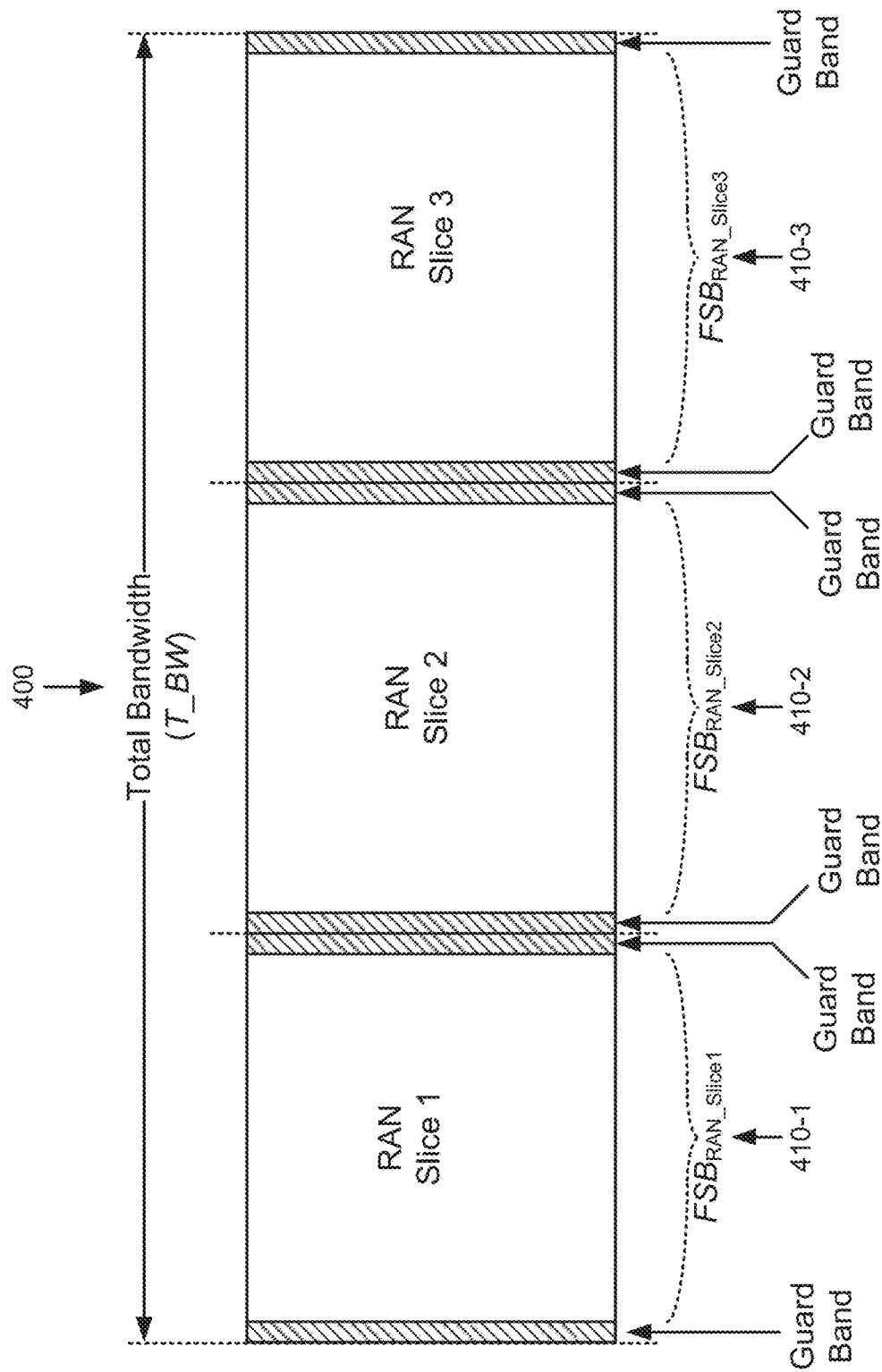
FIG. 4 depicts an example of fixed Radio Access Network (RAN) spectrum sub-band allocation as applied to three representative RAN network slices.

FIG. 4 depicts an example of fixed RAN spectrum sub-band allocation, as applied to three representative RAN network slices, using techniques described herein. RAN 130 of mobile network 110 may support a total available bandwidth (T_BW) 400 of RF spectrum. The UEs 105 (not shown) may transmit and/or receive data to/from RAN 130 (not shown) using RF frequencies within the total available bandwidth 400. Employing a fixed RAN spectrum sub-band allocation technique, described further below, the total available RAN bandwidth T_BW 400 may be divided into sub-bands and allocated to the existing network slices (e.g., network slices 1 through 3 in the example of FIG. 4) for use by the network slices during a current time window t. The fixed RAN spectrum sub-band allocation technique described below predicts the bandwidth for each network slice for the current time window t, based on a history of network slice throughput measurements, and allocates the RAN spectrum accordingly. The network slice throughput measurements are updated in each time window t and stored in memory to produce a history of network slice throughput measurements.

As shown in the example of FIG. 4, a first fixed sub-band $FSB_{RAN\_Slice1}$ 410-1 may be allocated to RAN network slice 1, a second fixed sub-band $FSB_{RAN\_Slice2}$ 410-2 may be allocated to RAN network slice 2, and a third fixed sub-band $FSB_{RAN\_Slice3}$ 410-3 may be allocated to RAN network slice 3 for the current time window t. As further shown in FIG. 4, guard bands may exist at the outer edges of each sub-band to prevent interference between the allocated sub-bands. In one exemplary implementation, network slice 1 may handle traffic for enhanced mobile broadband (eMBB) services/applications, network slice 2 may handle traffic for ultra-reliable low latency (URLLC) services/applications, and network slice 3 may handle traffic for IoT services/applications.

Figure 5:
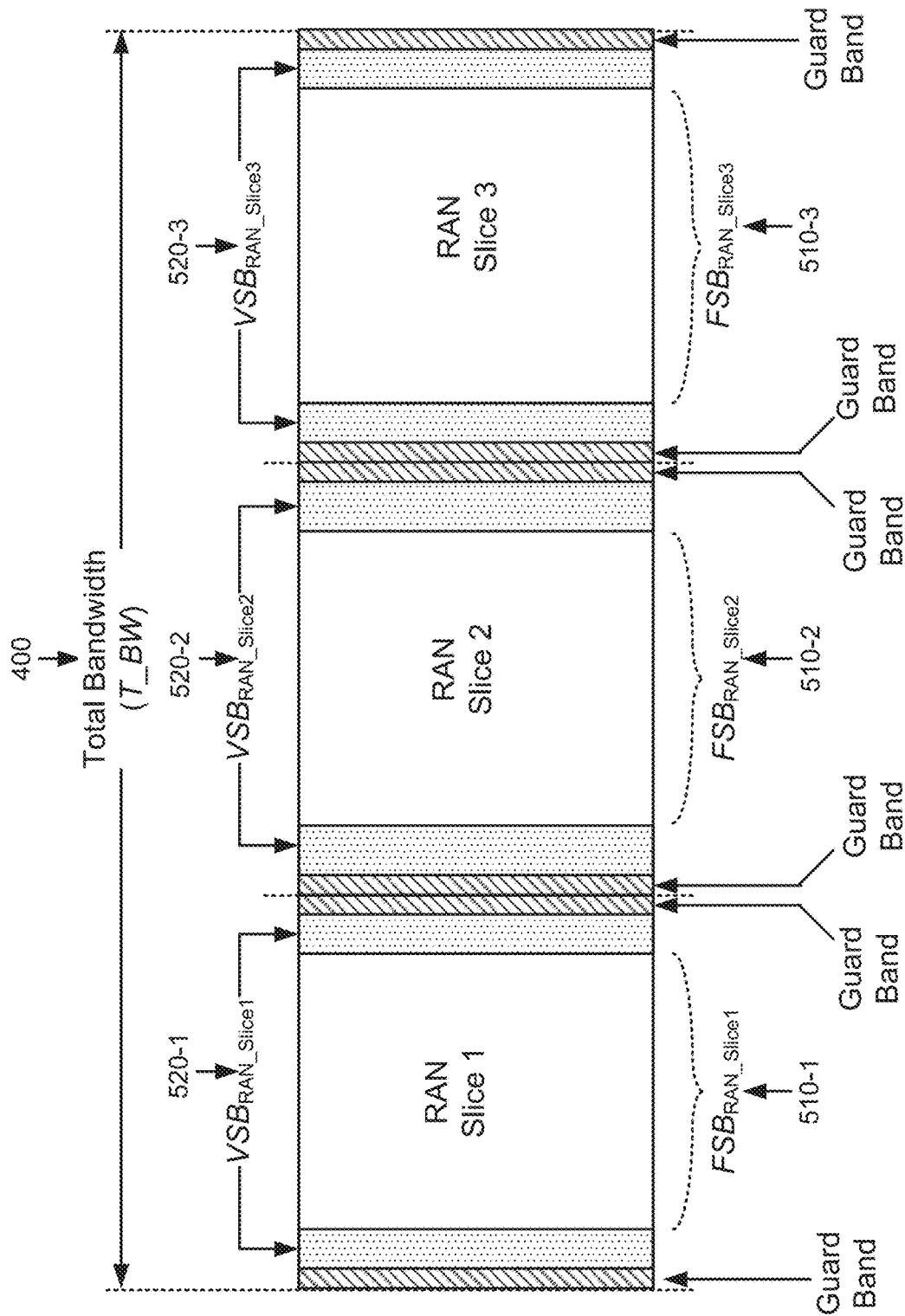
FIG. 5 depicts an example of variable RAN spectrum sub-band allocation as applied to three representative RAN network slices.

FIG. 5 depicts an example of variable RAN spectrum sub-band allocation, as applied to three representative RAN network slices, using techniques described herein. RAN 130 of mobile network 110 may, as described with respect to FIG. 4 above, support the total available bandwidth (T_BW) 400 of RF spectrum, and the UEs 105 (not shown) may transmit and/or receive data to/from RAN 130 (not shown) using RF frequencies within the total available bandwidth 400. Employing a variable RAN spectrum sub-band allocation technique, described further below, the total available RAN bandwidth T_BW 400 may be divided into fixed and variable sub-bands and allocated to the existing network slices (e.g., network slices 1 through 3 in the example of FIG. 5) for a current time window t. The fixed and variable RAN spectrum sub-band allocation technique described below obtains a history of network slice throughput measurements for each network slice and determines a mean and a standard deviation for the throughput for each network slice. The fixed and variable RAN spectrum sub-band allocation technique then allocates a fixed sub-band and a variable sub-band of RAN RF spectrum to each network slice based on the network slice throughput measurements, and the mean and standard deviation values for the network slice throughput measurements.

As shown in the example of FIG. 5, a first fixed sub-band $FSB_{RAN\_Slice1}$ 510-1 and a first variable sub-band $VSB_{RAN\_Slice1}$ 520-1 may be allocated to RAN network slice 1, a second fixed sub-band $FSB_{RAN\_Slice2}$ 510-2 and a second variable sub-band $VSB_{RAN\_Slice2}$ 520-2 may be allocated to RAN network slice 2, and a third fixed sub-band $FSB_{RAN\_Slice3}$ 510-3 and a third variable sub-band $VSB_{RAN\_Slice3}$ 520-3 may be allocated to RAN network slice 3. As further shown in FIG. 5, guard bands may exist at the outer edges of each variable sub-band to prevent interference between the allocated sub-bands, and each of variable sub-bands $VSB_{RAN\_Slice1}$ 520-1, $VSB_{RAN\_Slice2}$ 520-2, and $VSB_{RAN\_Slice3}$ 520-3 may be divided into two non-contiguous portions of RAN spectrum that encompass frequencies adjacent to the guard bands at the outer edges of the bandwidth allocated to each network slice. Similar to FIG. 4, network slice 1 may handle traffic for eMBB services/applications, network slice 2 may handle traffic for URLLC services/applications, and network slice 3 may handle traffic for IoT services/applications.

Consistent with implementations described herein, the allocated fixed RAN spectrum, including $FSB_{RAN\_Slice1}$ 510-1, $FSB_{RAN\_Slice2}$ 510-2, and $FSB_{RAN\_Slice3}$ 510-3 of FIG. 5, may be used exclusively by traffic within the network slice assigned to each fixed sub-band, while allocated variable RAN sub-bands may be shared with other network slices based on a current traffic demand in each network slice. For example, referring to FIG. 5, $VSB_{RAN\_Slice1}$ 520-1, allocated to RAN slice 1, may be shared with RAN Slice 2 based on a current traffic demand associated with RAN Slice 2. As another example, $VSB_{RAN\_Slice2}$ 520-2, allocated to RAN Slice 2, may be shared with RAN Slice 1 and/or RAN Slice 3, based on a current traffic demand associated with RAN Slice 1 and RAN Slice 3.

Figure 6A:
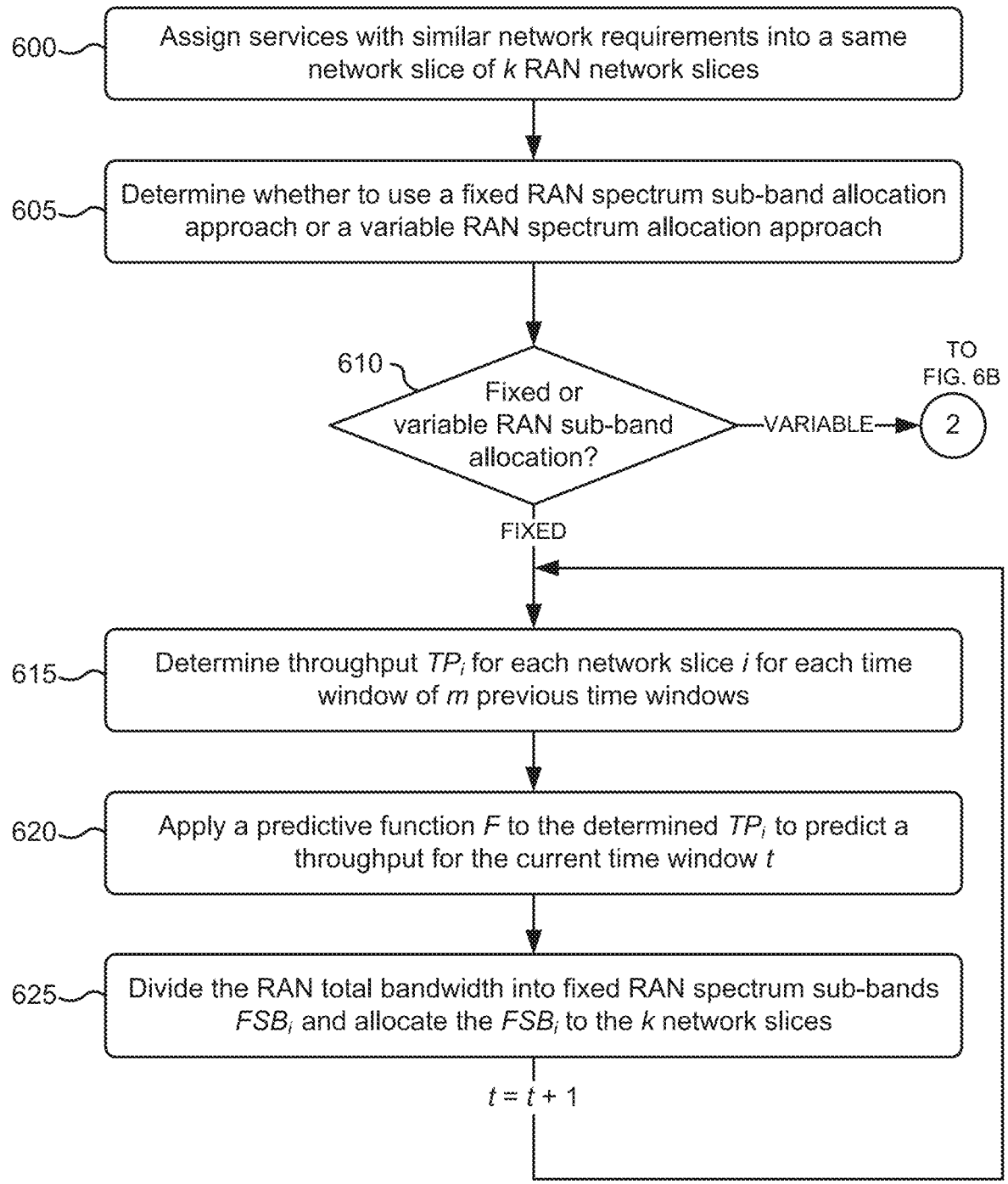
FIGS. 6A and 6B are flow diagrams that illustrate an exemplary process for dynamically allocating the total available radio frequency bandwidth of the RAN among multiple network slices.
Figure 6B:
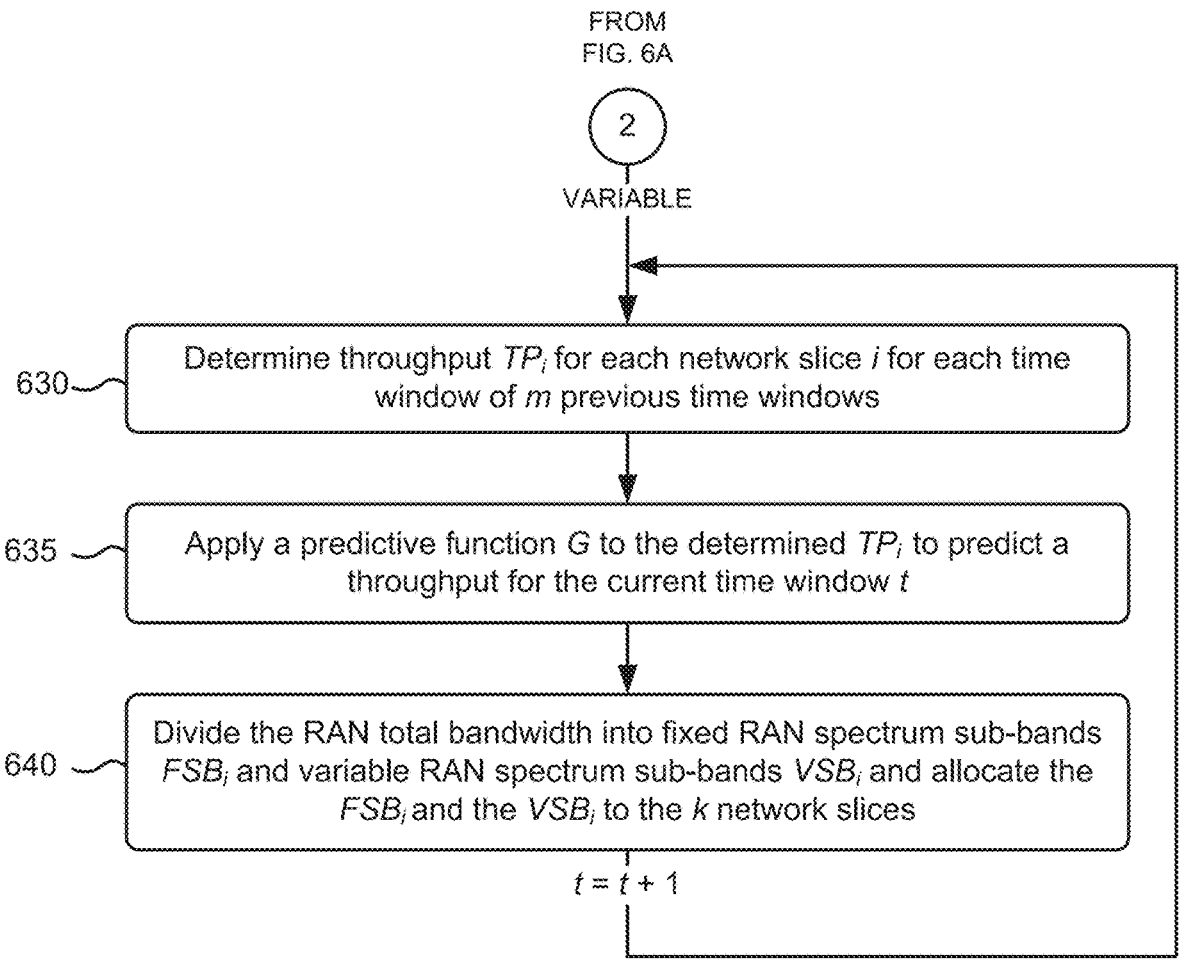

FIGS. 6A and 6B are flow diagrams that illustrate an exemplary process for dynamically allocating the total available RF bandwidth of RAN 130 among multiple network slices. The exemplary process of FIGS. 6A and 6B may be implemented by spectrum allocator 120.

The exemplary process includes spectrum allocator 120 assigning services with similar network requirements into a same network slice of multiple (k) RAN network slices (block 600). Spectrum allocator 120 may group services/applications by similarity in a network behavior required by each of the services/applications. For example, spectrum allocator 120 may identify similarities in required network behavior among n services/applications, and may group the n services/applications into k groups requiring a similar network behavior or performance. Each of the k groups of services/applications may then be allocated to a respective one of k RAN network slices. As a specific example, services 1 and 2 require mobile broadband service, services 3, 4 and 5 require a highly reliable and low latency service, and services 6 and 7 require an IoT or M2M service. Services 1 and 2 are grouped into a single group and allocated to an eMBB network slice. Services 3, 4 and 5 are grouped into a single group and allocated to a URLLC network slice. Services 6 and 7 are grouped into an IoT network slice.

Spectrum allocator 120 determines whether to use a fixed RAN spectrum sub-band allocation approach or a variable RAN spectrum allocation approach (block 605). After services are allocated to the k network slices, the RAN radio resource needs to be allocated among the k network slices. RAN spectrum allocation among the k network slices may be performed, as described herein, using a fixed RAN spectrum allocation approach or a variable RAN spectrum allocation approach. In the fixed RAN spectrum allocation approach, a fixed, pre-defined sub-band of RAN spectrum may be assigned to each network slice. In the variable RAN spectrum allocation approach, a fixed sub-band of RAN spectrum, and a variable sub-band of RAN spectrum, may be assigned to each network slice. The variable sub-band of RAN spectrum assigned to each network slice may be dynamically shared with other network slices based on changing traffic demands.

If using a fixed RAN spectrum sub-band allocation approach ("FIXED"—block 610), then spectrum allocator 120 determines a throughput $TP_i$ for each network slice i for each time window of m previous time windows t-1, t-2, t-3, ..., t-m (block 615). FIG. 7 depicts a sequence of time windows, including a current time window t and past time windows. On the x axis, the current time 700 is identified ("Now"), with the current time window t extending an interval of time into the future. x prior time windows (t-1, t-2, ..., t-x) are also shown, with each of the prior time windows extending a same, or a substantially same, interval of time as the other time windows. In some implementations, x may be a large or very large number. Spectrum allocator 120 obtains throughput measurement data $TP_i$ for each network slice for each time window, and stores the previous throughput measurement data $TP_i$ for previous time windows t-1, t-2, t-3, ..., t-x in memory for use in future time windows. Spectrum allocation 120 may store throughput measurements for x previous time windows for each network slice i: $TP_i(t-1)$, $TP_i(t-2)$, $TP_i(t-3)$, ..., $TP_i(t-x)$, where m≤x. One or more nodes in core network 135 and/or RAN 130 measure an average throughput for each network slice during a current time window t, and supply the average throughput measurement data for each network slice to spectrum allocator 120 for storing in memory as a history of network slice throughput measurements.

Spectrum allocator 120 applies a predictive function F to the determined $TP_i$ for the m previous time windows to predict a throughput $\widehat{TP}_i(t)$ for the current time window t for each network slice i (block 620). The predictive function F may include various different functions that predict a throughput $\widehat{TP}_i(t)$ for network slice i for time window t, including a simple average function, a weighted average function, an exponential moving average time series function, a recursive function, or a machine learning function. Other types of functions may be applied to the throughput data for m previous time windows for the network slices. The predictive function F may be represented by Eqn. (1):

$$\widehat{TP}_i(t) = F(TP_i(t-1), TP_i(t-2), \ldots, TP_i(t-m))$$

where i is a network slice of k network slices;
F is the predictive function;
$TP_i(t-1)$, $TP_i(t-2)$, $TP_i(t-3)$, ..., $TP_i(t-m)$ are the throughput measurements for network slice i over m previous time windows t-1, t-2, t-3, ..., t-m; and $\widehat{TP}_i(t)$ is the predicted throughput for network slice i for time window t.

Spectrum allocator 120 divides the RAN total bandwidth (T_BW) into k fixed RAN spectrum sub-bands ($FSB_i$, for i equals 1 to k) for the k network slices based on the predicted throughput $\widehat{TP}_i(t)$ for the time window t, and allocates the fixed RAN spectrum sub-bands $FSB_i$ to the k network slices (block 625). If T_BW is the total RAN spectrum bandwidth, and $FSB_i$ is the fixed sub-band allocated to network slice i, then spectrum allocator 120 may determine the fixed sub-band FSB of the total bandwidth T_BW to be allocated to each network slice i using the following:

$$FSB_i(t) = T\_BW \cdot \frac{\widehat{TP}_i(t)}{\sum_{i=1}^{k} \widehat{TP}_i(t)} \quad \text{(Eqn. (2))}$$

where k represents the number of network slices; and $\widehat{TP}_i(t)$ is the predicted throughput for each network slice, i=1, 2, ..., k, for the current time window t from block 620 (Eqn. (1)).

The RRUs of RAN 130 may use the allocated fixed RAN spectrum sub-bands $FSB_i$ for handling traffic for each of the k network slices. For example, the RRUs of RAN 130 allocate the fixed spectrum sub-band $FSB_1$ to network_slice_1 and subsequently uses $FSB_1$ for handling traffic for network slice 1. As a further example, the RRUs of RAN 130 allocate the fixed spectrum sub-band $FSB_2$ to network_slice_2 and subsequently uses $FSB_2$ for handling traffic for network_slice_2. As another example, the RRUs of RAN 130 allocate the fixed spectrum sub-band $FSB_k$ to network_slice_k and subsequently uses $FSB_k$ for handling traffic for network_slice_k. Subsequent to execution of block 630, the time window t may increment to the next time window (t=t+1), with a repeat of blocks 615 through 630 for the next time window t.

Returning to block 610, if using a variable RAN spectrum sub-band allocation approach ("VARIABLE"—block 610), then spectrum allocator 120 determines a throughput $TP_i$ for each network slice i for each time window of m previous time windows t-1, t-2, t-3, ..., t-m (block 630). Spectrum allocator 120 obtains throughput measurement data for each network slice i as described above with respect to block 615.

Spectrum allocator 120 applies a predictive function G to the determined $TP_i$ for the m previous time windows to predict a throughput $\widehat{TP}_i(t)$ for the current time window t for each network slice i (block 635). The predictive function G may include various different functions that predict a throughput $\widehat{TP}_i(t)$ for network slice i for time window t, including a simple average function, a weighted average function, an exponential moving average time series function, a recursive over time periods function, or a machine learning function. Other types of functions may be applied to the throughput data for m previous time windows for the network slices. The predictive function G may be a same function as function F (i.e., from Eqn. (1) above), or may be a different function than function F. The predictive function G may be represented by Eqn. (3):

$$\widehat{TP}_i(t) = G(TP_i(t-1), TP_i(t-2), \ldots, TP_i(t-m)) \quad \text{Eqn. (3)}$$

where i is a network slice of k network slices;
G is the predictive function;
$TP_i(t-1)$, $TP_i(t-2)$, $TP_i(t-3)$, ..., $TP_i(t-m)$ are the throughput measurements for network slice i at m previous time windows t-1, t-2, t-3, ..., t-m; and $\widehat{TP}_i(t)$ is the predicted throughput for network slice i for time window t.

Spectrum allocator 120 divides the RAN total bandwidth (T_BW) into k fixed RAN spectrum sub-bands ($FSB_i$, for i equals 1 to k) and k variable RAN spectrum sub-bands ($VSB_i$, for i equals 1 to k) for the k network slices based on the predicted throughput $\widehat{TP}_i(t)$ for the time window t, and allocates the fixed RAN spectrum sub-bands $FSB_i$ and variable RAN spectrum sub-bands $VSB_i$ to the k network slices (block 640). With a large number of time windows (i.e., large m), the throughput $TP_i$ for each network slice is normally distributed (i.e., has a normal distribution N) with a mean $\mu_i$ and standard deviation $\sigma_i$ as follows:

$$TP_i(t) \sim N(\mu_i, \sigma_i^2) \quad \text{Eqn. (4)}$$

where the mean $\mu_i$ equals $$\frac{\sum_{j=1}^{m} TP_i(t-j)}{m};$$

and
where the standard deviation $\sigma_1$ equals $$\sqrt{\frac{\sum_{j=1}^{m}(TP_i(t-j)-\mu_i)^2}{m}}.$$

If T_BW is the total RAN spectrum bandwidth, $FSB_i$ is the fixed sub-band allocated to network slice i, and $VSB_i$ is the variable sub-band allocated to network slice i, then spectrum allocator 120 may determine the fixed sub-band FSB and the variable sub-band VSB of the total bandwidth T_BW to be allocated to each network slice i using Eqns. (5), (6), and (7):

$$BW_i(t) = T\_BW \cdot \frac{\mu_i + \sigma_i}{\sum_{i=1}^{k}\mu_i + \sigma_i} \qquad \text{Eqn. (5)}$$

The value of the bandwidth $BW_i(t)$ for network slice i for the current time window t, determined in Eqn. (5), may then be used in Eqns. (6) and (7) to determine $FSB_i$ and $VSB_i$:

$$FSB_i(t) = BW_i(t) \cdot \frac{\mu_i}{\mu_i + \sigma_i} \qquad \text{Eqn. (6)}$$

$$VSB_i(t) = BW_i(t) \cdot \frac{\sigma_i}{\mu_i + \sigma_i} \qquad \text{Eqn. (7)}$$

The RRUs of RAN 130 may use the allocated fixed RAN spectrum sub-bands $FSB_i$ and variable RAN spectrum sub-band $VSB_i$ for handling traffic for each ith network slice of the k network slices. Additionally, the RRUs of RAN 130 may use the variable RAN spectrum sub-band $VSB_i$ for sharing with, and handling traffic of, other network slices, such as neighboring network slices (e.g., network slice i−1 and/or i+1). For example, the RRUs of RAN 130 allocate the fixed spectrum sub-band $FSB_1$ and variable spectrum sub-band $VSB_1$ to network_slice_1 and subsequently use $FSB_1$ and $VSB_1$ for handling traffic for network_slice_1, with possible sharing of $VSB_1$ with other network slices based on traffic demand within network_slice_1 and the other network slices. As a further example, the RRUs of RAN 130 allocate the fixed spectrum sub-band $FSB_2$ and variable spectrum sub-band $VSB_2$ to network_slice_2 and subsequently use $FSB_2$ and $VSB_2$ for handling traffic for network_slice_2, with possible sharing of $VSB_2$ with other network slices based on traffic demand within network_slice_2 and the other network slices. As another example, the RRUs of RAN 130 allocate the fixed spectrum sub-band $FSB_k$ and variable spectrum sub-band $VSB_k$ to network_slice_k and subsequently use $FSB_k$ and $VSB_k$ for handling traffic for network_slice_k, with possible sharing of $VSB_k$ with other network slices based on traffic demand within network_slice_k and the other network slices. Subsequent to execution of block 650, the time window t may increment to the next time window (t=t+1), with a repeat of blocks 635 through 650 for the next time window t.

Figure 8:
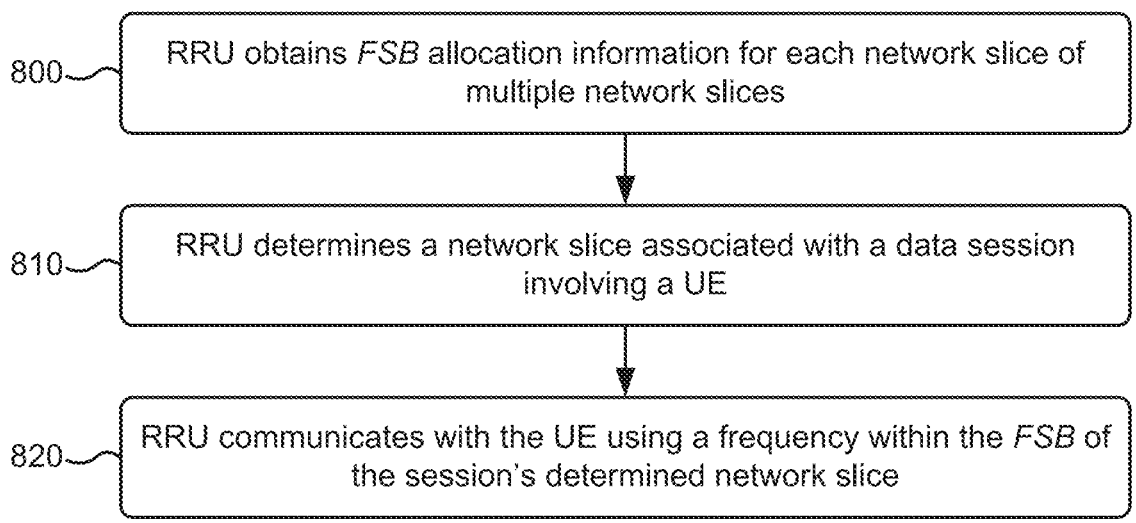
FIG. 8 is a flow diagram that illustrates an exemplary process for an RRU of the RAN of FIG. 1 to communicate with a UE within a fixed sub-band allocated to a network slice associated with the UE's session.

FIG. 8 is a flow diagram that illustrates an exemplary process for an RRU of RAN 130 to communicate with a UE 105 within a fixed sub-band allocated to a network slice associated with the UE 105's session. The exemplary process of FIG. 8 may be implemented by a RRU of RAN 130 when fixed RAN spectrum sub-band allocation has been used (e.g., blocks 615 through 625 of FIG. 6A have been executed for allocating RF spectrum of RAN 130 to network slices).

The exemplary process includes the RRU of RAN 130 obtaining fixed sub-band (FSB) allocation information for each network slice of multiple network slices (block 800). The RRU of RAN 130 obtains the FSB allocation information, determined in block 625 of the process of FIGS. 6A and 6B, from spectrum allocator 120.

The RRU of RAN 130 determines a network slice associated with a data session involving a UE 105 (block 810). A UE 105 may initiate a data session via a RRU of RAN 130, or a node within mobile network 110 or data network 115 may initiate a data session with the UE 105 via the RRU of RAN 130. Upon initiation of the data session, the RRU of RAN 130 determines a network slice of the k network slices that handles the traffic for the data session. For example, if the UE 105 is executing a video streaming application, requiring broadband mobile service, then the RRU of RAN 130 determines that the eMBB network slice should handle the traffic of the data session. As another example, if the UE 105 is executing a gaming or VR/AR application, requiring very low latency mobile service, then the RRU of RAN 130 determines that the URLLC network slice should handle the traffic of the data session.

The RRU of RAN 130 communicates with the UE 105 using a frequency within the FSB of the session's determined network slice (block 820). Referring to the fixed RAN sub-band allocation example of FIG. 4, the RRU of RAN 130 (not shown) uses a radio frequency within $FSB_{RAN\_Slice1}$ 410-1 of RAN Slice 1 for communication with the UE 105, where RAN Slice 1 handles the type of traffic of the data session.

Figure 9A:
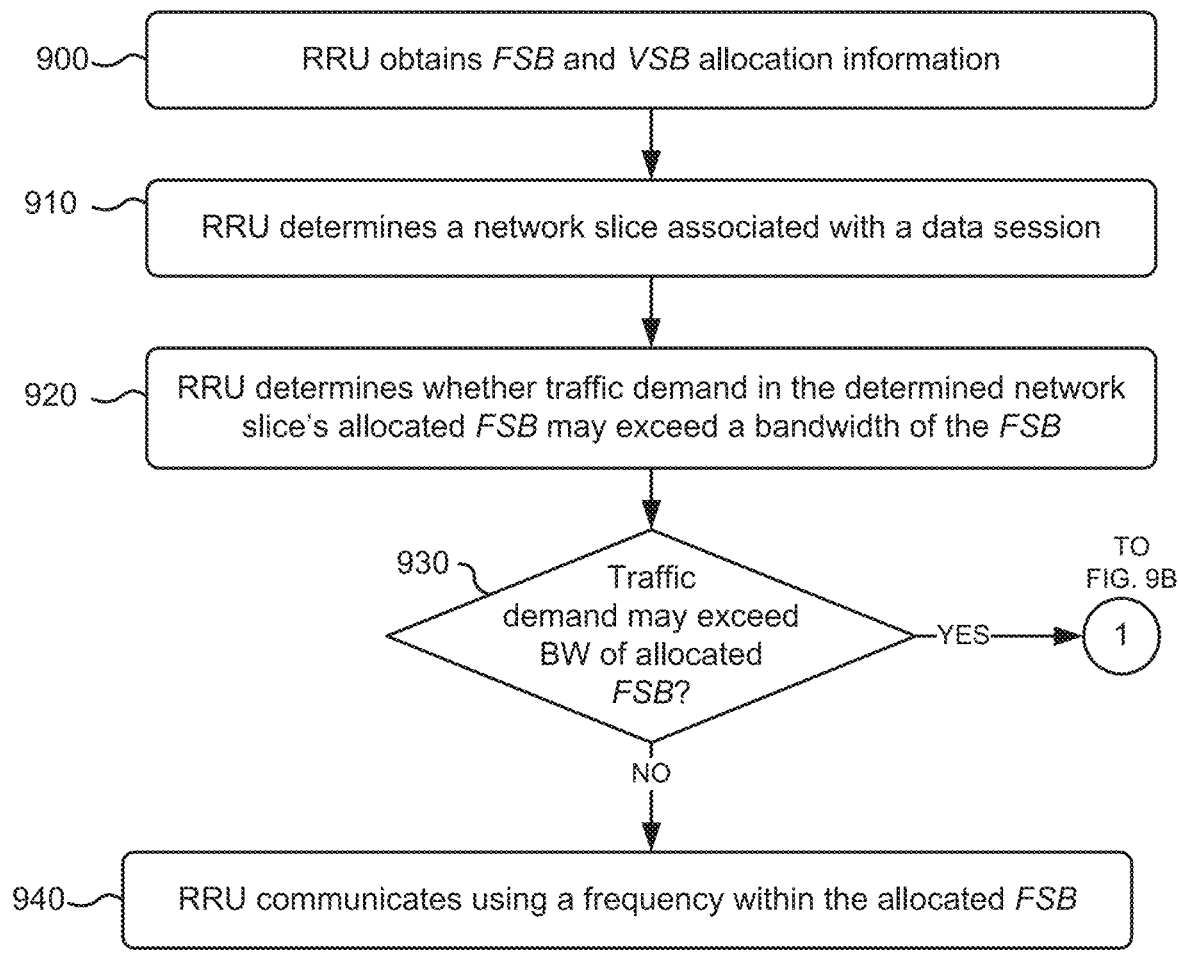
FIGS. 9A and 9B are flow diagrams that illustrate an exemplary process for an RRU of the RAN of FIG. 1 to communicate with a UE within a fixed sub-band or a variable sub-band allocated to a network slice associated with the UE's session or within a variable sub-band allocated to a neighboring network slice.
Figure 9B:
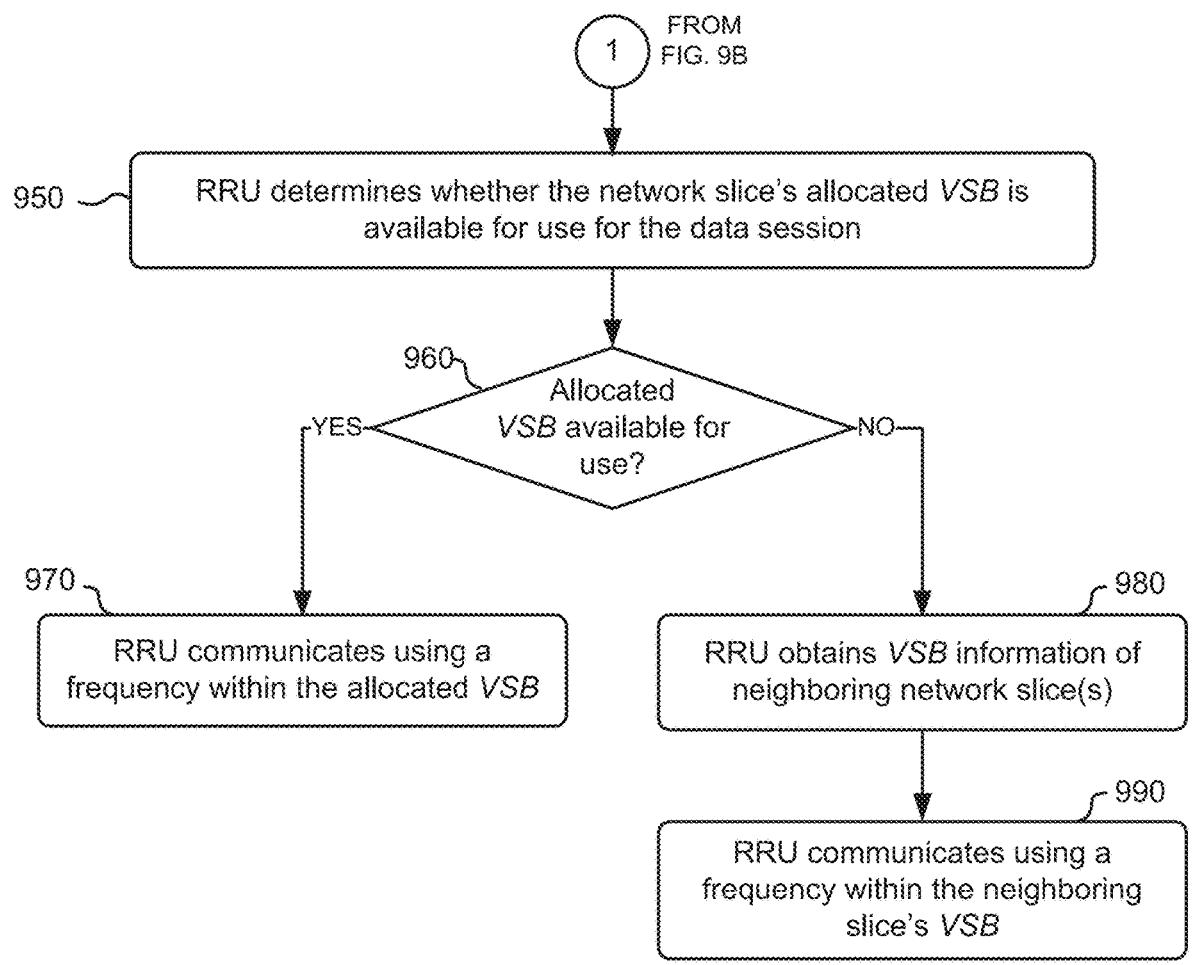

FIGS. 9A and 9B are flow diagrams that illustrate an exemplary process for a RRU of RAN 130 to communicate with a UE 105 within a fixed sub-band or a variable sub-band allocated to a network slice associated with the UE 105's session or within a variable sub-band allocated to a neighboring network slice. The exemplary process of FIGS. 9A and 9B may be implemented by a RRU of RAN 130 when variable RAN spectrum sub-band allocation has been used (e.g., blocks 630 through 640 of FIG. 6B have been executed for allocating RF spectrum of RAN 130 to network slices).

The exemplary process includes the RRU of RAN 130 obtaining fixed sub-band (FSB) and variable sub-band (VSB) allocation information for each network slice of multiple network slices (block 900). The RRU of RAN 130 obtains the FSB and VSB allocation information, determined in block 640 of the process of FIGS. 6A and 6B, from spectrum allocator 120.

The RRU determines a network slice associated with a data session involving a UE 105 (block 910). A UE 105 may initiate a data session via a RRU of RAN 130, or a node within mobile network 110 or data network 115 may initiate a data session with the UE 105 via the RRU of RAN 130. Upon initiation of the data session, the RRU of RAN 130 determines a network slice of the k network slices that handles the traffic for the data session, as already described with respect to block 810 of FIG. 8.

The RRU determines whether the traffic demand in the determined network slice's allocated FSB may exceed a bandwidth of the FSB (block 920). The RRU of RAN 130 determines a current traffic demand on the network slice's allocated FSB for other active data sessions and further determines if addition of the data session involving the UE 105 may exceed, or come within a predetermined threshold of exceeding, the current unused bandwidth of the FSB. If the traffic demand in the determined network slice's allocated FSB may not exceed the FSB's bandwidth (NO—block 930), then the RRU communicates with the UE 105 using a frequency within the FSB of the session's determined network slice (block 940). When the RRU of RAN 130 determines that the current traffic demand on the network slice's allocated FSB for other active data sessions plus the additional anticipated traffic demand of the data session involving the UE 105 is not expected to exceed, or come within the predetermined threshold of exceeding, the current unused bandwidth of the FSB, then the RRU of RAN 130 uses a frequency within the RF spectrum of the FSB for communicating with the UE 105.

If the traffic demand in the determined network slice's allocated FSB may exceed the FSB's bandwidth (YES—block 930), then the RRU determines whether the network slice's allocated VSB is available for use for the UE 105's data session (block 950) (FIG. 9B). When the RRU of RAN 130 determines that the current traffic demand on the network slice's allocated FSB for other active data sessions plus the additional anticipated traffic demand of the data session involving the UE 105 is expected to exceed, or come within a predetermined threshold of exceeding, the current unused bandwidth of the FSB, then the RRU of RAN 130 decides whether to use the network slice's allocated VSB, or to use the VSB of a neighboring network slice, based on whether there is a sufficient amount of the network slice's allocated VSB available for use by the UE 105's data session. For example, if the VSB allocated to the network slice is x bandwidth (BW), the current traffic demand on the VSB of the network slice is y BW (where y<x), the anticipated bandwidth of the UE 105's data session is z, and y+z≥x, then the RRU of RAN 130 determines that the network slice's VSB is not available for use by the UE 105's data session. As a further example, if the VSB allocated to the network slice is x BW, the current traffic demand on the VSB of the network slice is y BW (where y<x), the anticipated bandwidth of the UE 105's data session is z, and y+z<x, then the RRU of RAN 130 determines that the network slice's VSB is available for use by the UE 105's data session.

If the network slice's allocated VSB is available for use for the UE 105's data session (YES—block 960), then the RRU communicates with the UE 105 using a frequency within the VSB of the session's determined network slice (block 970). When the RRU of RAN 130 determines that the current traffic demand on the network slice's allocated VSB for other active data sessions plus the additional anticipated traffic demand of the data session involving the UE 105 is not expected to exceed, or come with a predetermined threshold of exceeding, the current unused bandwidth of the VSB, then the RRU of RAN 130 uses a frequency within the RF spectrum of the VSB of the session's determined network slice for communicating with the UE 105.

If the network slice's allocated VSB is not available for use for the UE 105's data session (NO—block 960), then the RRU obtains VSB information of a neighboring network slice(s) (block 980) and communicates with the UE 105 using a frequency within the VSB of the neighboring network slice (block 990). When the RRU of RAN 130 determines that the current traffic demand on the network slice's allocated VSB for other active data sessions plus the additional anticipated traffic demand of the data session involving the UE 105 is expected to exceed, or come within the predetermined threshold of exceeding, the current unused bandwidth of the VSB, then the RRU of RAN 130 determines the VSB information for a neighboring network slice(s) and then uses a frequency within the RF spectrum of the VSB of the neighboring network slice for communicating with the UE 105. Referring to the example of FIG. 5, if the data session of the UE 105 is handled by RAN Slice 2, and the $VSB_{RAN\_Slice2}$ 520-2 is not available for use by the data session, then the RRU of RAN 130 serving the UE 105 may determine that a frequency within $VSB_{RAN\_Slice1}$ 520-1 of RAN Slice 1 and/or $VSB_{RAN\_Slice3}$ 520-3 of RAN Slice 3 may be used for communicating with the UE 105.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6A, 6B, 8, 9A, and 9B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 520) of a device. A non-transitory storage medium includes one or more of the storage mediums described in relation to memory 530. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining a throughput for each network slice of multiple network slices in a mobile network over a number of time windows;
    predicting a future throughput for each network slice of the multiple network slices based on the determined throughput;
    determining an available bandwidth of a Radio Access Network (RAN) of the mobile network; and
    allocating a respective portion of the available bandwidth of the RAN to each network slice of the multiple network slices based on the predicted future throughput for each network slice, wherein the allocating the respective portion of the total available bandwidth of the RAN to each network slice of the multiple network slices comprises:
    dividing the available bandwidth of the RAN into the respective portion by multiplying the available bandwidth by a value corresponding to the predicted future throughput for each network slice divided by a sum of the predicted future throughputs of the multiple network slices.

2. The method of claim 1, wherein determining the throughput for each network slice comprises:
    determining a history of throughput values for each network slice over the number of time windows.

3. The method of claim 2, wherein predicting the future throughput for each network slice further comprises:
    applying a function to the determined history of throughput values for each network slice.

4. The method of claim 3, where the function comprises a simple average, a weighted average, an exponential moving average time series, a recursive, or a machine learning function.

5. The method of claim 1, wherein the respective portion comprises a first sub-band and a second sub-band allocated to each network slice and wherein the second sub-band comprises bandwidth for sharing among the multiple network slices.

6. The method of claim 1, wherein the respective portion comprises a fixed RAN sub-band $FSB_i(t)$ for each network slice i of k network slices for a time window t, the available bandwidth comprises the RAN total bandwidth $T\_BW$, and the predicted future throughput for each network slice i for the time window t comprises $\widehat{TP}_i(t)$, and wherein dividing the available bandwidth comprises using:

$$FSB_i(t) = T\_BW \cdot \frac{\widehat{TP}_i(t)}{\sum_{i=1}^{k} \widehat{TP}_i(t)}.$$

7. The method of claim 1, wherein predicting the future throughput $\widehat{TP}_i(t)$ for each network slice (i) further comprises:
    determining throughput values $(TP_i(t-1), TP_i(t-2), \ldots, TP_i(t-m))$ for each network slice i for each time window over the number (m) of time windows previous to a time window t; and
    applying a function (F) to the determined throughput values for each network slice i to determine the future throughput $\widehat{TP}_i(t)$ according to the following:

$$\widehat{TP}_i(t) = F(TP_i(t-1), TP_i(t-2), \ldots, TP_i(t-m)),$$

wherein the function F comprises a simple average, a weighted average, an exponential moving average time series, a recursive, or a machine learning function.

8. A device, comprising:
    a communication interface coupled to a mobile network; and
    a processor configured to:
        determine a throughput for each network slice of multiple network slices in the mobile network over a number of time windows,
        predict a future throughput for each network slice of the multiple network slices based on the determined throughput,
        determine an available bandwidth of a Radio Access Network (RAN) of the mobile network, and
        allocate a respective portion of the available bandwidth of the RAN to each network slice of the multiple network slices based on the predicted future throughput for each network slice, wherein, when allocating the respective portion of the available bandwidth of the RAN, the processor is further configured to:
        determine, based on the predicted future throughput for each network slice, a mean and standard deviation of the predicted future throughput for each network slice; and
        divide the available bandwidth of the RAN into the respective portion based on the mean and standard deviation of the predicted future throughput for each network slice.

9. The device of claim 8, wherein, when determining the throughput for each network slice, the processor is further configured to:
    determine a history of throughput values for each network slice over the number of time windows.

10. The device of claim 9, wherein, when predicting the future throughput for each network slice, the processor is further configured to:
    apply a function to the determined history of throughput values for each network slice.

11. The device of claim 10, where the function comprises a simple average, a weighted average, an exponential moving average time series, a recursive, or a machine learning function.

12. The device of claim 8, wherein the respective portion comprises a first sub-band and a second sub-band allocated to each network slice and wherein the second sub-band comprises bandwidth for sharing among the multiple network slices.

13. The device of claim 8, wherein, when predicting the future throughput $\widehat{TP}_i(t)$ for each network slice (i), the processor is further configured to:
    determine throughput values ($TP_i(t-1)$, $TP_i(t-2)$, ..., $TP_i(t-m)$) for each network slice i for each time window over the number (m) of time windows previous to a time window t; and
    apply a function (G) to the determined throughput values for each network slice i to determine the future throughput $\widehat{TP}_i(t)$ according to the following:

$$\widehat{TP}_i(t) = G(TP_i(t-1), TP_i(t-2), \ldots, TP_i(t-m)),$$

wherein the function G comprises a simple average, a weighted average, an exponential moving average time series, a recursive, or a machine learning function.

14. The device of claim 8, wherein the respective portion comprises a first sub-band and a second sub-band allocated to each network slice, wherein the second sub-band comprises bandwidth for sharing among the multiple network slices, and wherein, when dividing the available bandwidth of the RAN into the respective portion, the processor is further configured to:
    determine the first sub-band based on a first value derived from dividing the mean by a sum of the mean and the standard deviation, and
    determine the second sub-band based on a second value derived from dividing the standard deviation by the sum of the mean and the standard deviation.

15. A non-transitory storage medium storing instructions executable by a device, wherein the instructions comprise instructions to cause the device to:
    determine a throughput for each network slice of multiple network slices in a mobile network over a number of time windows;
    predict a future throughput for each network slice of the multiple network slices based on the determined throughput;
    determine an available bandwidth of a Radio Access Network (RAN) of the mobile network; and
    allocate a respective portion of the available bandwidth of the RAN to each network slice of the multiple network slices based on the predicted future throughput for each network slice,
    wherein the instructions to cause the device to allocate the respective portion of the available bandwidth of the RAN to each network slice further comprises instructions to cause the device to:
    divide the available bandwidth of the RAN into the respective portion by multiplying the available bandwidth by a value that is derived from a sum of the predicted future throughput for each network slice over the multiple network slices or is derived from a mean and standard deviation of the predicted future throughput over at least a portion of the number of time windows.

16. The non-transitory storage medium of claim 15, wherein the instructions to cause the device to determine the throughput for each network slice further comprise instructions to cause the device to:
    determine history of throughput values for each network slice over the number of time windows.

17. The non-transitory storage medium of claim 16, wherein predicting the future throughput for each network slice further comprises:
    applying a function to the determined history of throughput values for each network slice.

18. The non-transitory storage medium of claim 17, wherein the function comprises a simple average, a weighted average, an exponential moving average time series, a recursive, or a machine learning function.

19. The non-transitory storage medium of claim 15, wherein the
    value further comprises the predicted future throughput for each network slice divided by the sum of the predicted future throughput for each network slice over the number of time windows.

20. The non-transitory storage medium of claim 15, wherein the respective portion comprises a first sub-band and a second sub-band allocated to each network slice and wherein the second sub-band comprises bandwidth for sharing among the multiple network slices.

* * * * *